(12) United States Patent
Singh et al.

(10) Patent No.: US 10,684,196 B2
(45) Date of Patent: Jun. 16, 2020

(54) VIRTUAL DIESEL EXHAUST FLUID (DEF) QUALITY MONITOR

(71) Applicant: International Engine intellectual Property Company, LLC, Lisle, IL (US)

(72) Inventors: Navtej Singh, Arlington Heights, IL (US); Paul Boon Charintranond, Chicago, IL (US)

(73) Assignee: International Engine Intellectual Property Company, LLC., Lisle, IL (US)

( * ) Notice: Subject to any disclaimer, the term of this patent is extended or adjusted under 35 U.S.C. 154(b) by 43 days.

(21) Appl. No.: 15/883,965

(22) Filed: Jan. 30, 2018

(65) Prior Publication Data
US 2019/0049341 A1 Feb. 14, 2019

Related U.S. Application Data

(60) Provisional application No. 62/471,117, filed on Mar. 14, 2017.

(51) Int. Cl.
| | | |
|---|---|---|
| G01M 15/10 | (2006.01) | |
| F01N 11/00 | (2006.01) | |
| F01N 3/20 | (2006.01) | |

(52) U.S. Cl.
CPC .......... *G01M 15/104* (2013.01); *F01N 3/208* (2013.01); *F01N 3/2066* (2013.01); *F01N 11/00* (2013.01); *F01N 11/007* (2013.01); *F01N 2550/05* (2013.01); *F01N 2560/026* (2013.01); *F01N 2560/14* (2013.01); *F01N 2610/02* (2013.01); *F01N 2610/146* (2013.01); *F01N 2900/1616* (2013.01); *F01N 2900/1622* (2013.01); *F01N 2900/1818* (2013.01); *Y02A 50/2325* (2018.01); *Y02T 10/24* (2013.01); *Y02T 10/47* (2013.01)

(58) Field of Classification Search
CPC .... G01M 15/104; F01N 11/007; F01N 11/00; F01N 3/208; F01N 3/2066; F01N 2900/1818; F01N 2900/1622; F01N 2900/1616; F01N 2610/146; F01N 2610/02; F01N 2560/14; F01N 2560/026; F01N 2550/05; Y02A 50/2325; Y02T 10/24; Y02T 10/47
See application file for complete search history.

(56) References Cited

U.S. PATENT DOCUMENTS

| | | | | |
|---|---|---|---|---|
| 8,117,834 | B2 * | 2/2012 | Toshioka | F01N 3/2066 60/301 |
| 8,209,964 | B2 * | 7/2012 | Kesse | F01N 3/2066 60/295 |
| 9,708,959 | B2 * | 7/2017 | Hendrickson | F01N 11/00 |
| 9,845,717 | B2 * | 12/2017 | Girardi | F01N 3/208 |
| 9,976,464 | B1 * | 5/2018 | Ciaravino | F01N 13/0093 |
| 9,989,548 | B2 * | 6/2018 | Muz | G01N 35/00623 |
| 10,316,719 | B2 * | 6/2019 | Han | F01N 11/00 |

* cited by examiner

*Primary Examiner* — Freddie Kirkland, III
(74) *Attorney, Agent, or Firm* — Jack D. Nimz; Jeffrey P. Calfa; Mark C. Bach

(57) ABSTRACT

A virtual diesel exhaust fluid (DEF) quality monitor repeatedly performs an intrusive test for disclosing use of adulterated DEF by injecting a controlled quantity of DEF into a diesel engine exhaust aftertreatment system upstream of an SCR catalyst while the engine operates and then processing certain data obtained from the test.

20 Claims, 6 Drawing Sheets

$$NO + NO_2 + 2NH_3 \rightarrow 2N_2 + 3H_2O$$

$$4NO + 4NH_3 + O_2 \rightarrow 4N_2 + 6H_2O$$

$$\text{Urea concentration} = \int \frac{NO_x \text{In (moles/s)} - NO_x \text{Out (moles/s)}}{NH_3 \text{In (moles/s)}}$$

$$\text{DEF dilution} = 1 - \frac{\text{Urea concentration}}{32.5}$$

VIRTUAL DIESEL EXHAUST FLUID (DEF) QUALITY MONITOR

REFERENCE TO A RELATED APPLICATION AND PRIORITY CLAIM

This application claims priority of, and incorporates by reference, Provisional App. Ser. No. 62/471,117, filed Mar. 14, 2017.

TECHNICAL FIELD

This disclosure relates generally to treatment of diesel engine exhaust by injection of diesel exhaust fluid (DEF) into a diesel engine exhaust aftertreatment system having an SCR (selective catalytic reduction) catalyst for converting, by chemical reactions, oxides of nitrogen (NOx) in the exhaust into nitrogen ($N_2$) and water ($H_2O$) before the exhaust can enter the surrounding atmosphere. More particularly, the disclosure introduces a virtual DEF quality monitor which employs a strategy for disclosing use of DEF whose quality is insufficient to enable a properly operating exhaust aftertreatment system to comply with specified NOx emission criteria.

BACKGROUND

One technology for aftertreatment of diesel engine exhaust utilizes SCR to enable known chemical reactions which convert NOx into nitrogen ($N_2$) and water ($H_2O$), two constituents found in abundance in earth's atmosphere. A reaction may occur between only ammonia ($NH_3$) stored on surface sites of an SCR catalyst and NOx in the exhaust or a reaction may involve those two reactants and an additional reactant, oxygen ($O_2$), if the latter is also present in the exhaust.

Ammonia which is used in those reactions is created by chemical reactions involving DEF, an aqueous mixture of urea and deionized water (for example, 32.5% urea and 67.5% deionized water), which is injected into the aftertreatment system. When DEF is injected into engine exhaust, exhaust heat vaporizes the water and decomposes the urea. One of the products of urea decomposition is $NH_3$ whose molecules attach to catalytic sites on washcoat surfaces of the SCR catalyst and are available to reduce NOx in exhaust passing across those surfaces by chemical conversion to $N_2$ and $H_2O$.

One factor in the ability of a properly functioning exhaust aftertreatment system to reduce NOx in sufficient quantity for compliance with specified NOx emission criteria depends on use of DEF whose formulation is compliant with a DEF performance standard which defines a correlation of quantity of NOx reduced with quantity of DEF injected. For example, a DEF performance standard may be defined by a DEF manufacturer specifying certain characteristics of its DEF formulation such as urea/water percentages and shelf life. Specifying shelf life is intended to avoid use of DEF which has been stored for a length of time beyond which the formulation may begin to degrade and therefore lose its effectiveness in reducing NOx. Adding a liquid diluent such as water to a DEF manufacturer's formulation reduces the percentage of urea in the mixture and that reduces the DEF's effectiveness in reducing NOx.

In a vehicle which is propelled by a diesel engine, such as a commercial truck for example, a urea quality sensor may be installed in an on-board DEF storage tank to monitor DEF quality. The urea quality sensor monitors the DEF formulation for compliance with a performance standard which correlates quantity of NOx reduced with quantity of DEF injected. One purpose of a urea quality sensor is to detect diluted DEF in the storage tank. DEF may be diluted, either intentionally or unintentionally, when the vehicle is stopped and the storage tank is refilled. When diluted DEF is detected by a urea quality sensor, a fault is logged in an on-board diagnostic system, and a warning alert may be given, such as by illumination of a warning light. Accuracy of a urea quality sensor has an approximate range of +/−3%.

SUMMARY OF THE DISCLOSURE

At any given time the number of sites on surfaces of an SCR catalyst to which ammonia molecules can attach is a function of certain variables, particularly temperature and age of the catalyst. A catalyst may provide a greater number of sites within a certain temperature range (which may be referred to as optimal temperature range) than at temperatures outside that range. The optimal temperature range may be a function of the particular type of SCR catalyst.

The number of sites available to store ammonia decreases as the SCR catalyst ages, and hence quantity of ammonia which an SCR catalyst can store is a function of its age. At some age the SCR catalyst washcoat will begin to degrade due to a history of repeated exposure to heat, causing the number of sites available for ammonia molecule attachment to begin to decrease. Once the process has begun, an SCR catalyst will experience an ever-increasing irreversible decrease in its ability to store ammonia for converting NOx into $N_2$ and $H_2O$. At some point, the decrease will become significant enough to have an effect on compliance of the engine with applicable NOx emission criteria, such as criteria specified by government regulation, when DEF which is compliant with its performance standard is being used.

A diesel engine has a diesel exhaust aftertreatment system including a DEF injector for injecting DEF from an on-board DEF storage tank into diesel engine exhaust passing through the aftertreatment system to convert NOx into $N_2$ and $H_2O$. DEF injection quantity is controlled by a DEF injection strategy embodied in an electronic engine controller. A diesel engine which propels a vehicle such as a commercial truck is an example of one such diesel engine. To guard against the possibility of use of DEF which has become adulterated such as by excessive dilution or by degradation due to age, and is therefore non-compliant with its manufacturer's formulation for compliance with a performance standard, a virtual DEF quality monitor replaces, or can be used in addition to, a urea quality sensor in a DEF storage tank. At various times during operation of the diesel engine, the virtual DEF quality monitor performs an intrusive test. This repetitively occurring intrusive test is a new and additional tool for monitoring NOx emission compliance with specific focus on accurately disclosing non-compliant DEF in the DEF storage tank without necessarily having a urea quality sensor in the storage tank.

Briefly, the intrusive test comprises successive first, second, and third phases. During the first phase the SCR catalyst is purged of stored ammonia. During the second phase DEF is injected into the engine's exhaust aftertreatment system upstream of the SCR catalyst in a predetermined specified quantity while measurements of NOx are taken by a first sensor upstream of the SCR catalyst and a second sensor downstream of the SCR catalyst. During the third phase the measurements taken by the two sensors during the second phase are processed according to a strategy which will disclose, with a high degree of accuracy, if DEF which was injected failed to comply with the proper formulation for compliance with the performance standard which it was expected to meet.

An intrusive test is allowed to begin only after certain conditions precedent have been satisfied. Some of those conditions are mandatory for proper performance of the test, but others may or may apply as deemed appropriate for a particular vehicle.

Performance of an intrusive test is controlled by one or more processors, for example an existing processor in a vehicle's electronic engine controller or a separate processor devoted to exclusive use by the virtual DEF quality monitor but perhaps operating in coordination with a processor in the engine controller.

When an intrusive test begins, the first phase disallows DEF injection, causing the SCR catalyst to be purged of stored ammonia as the engine continues to operate. Once ammonia has been sufficiently purged to allow the second phase to proceed, the second phase causes the DEF injector to inject DEF in quantity which, for DEF whose formulation complies with a DEF performance standard, has been predetermined to enable the SCR catalyst to reduce quantity of NOx in engine exhaust to a quantity not less than a first NOx reduction target which is greater than a second NOx reduction target below which failure of the SCR catalyst is indicated. Upon completion of the second phase, the third phase processes measurements obtained from the first sensor and the second sensor during the second phase to calculate quantity of NOx reduced during the second phase. When the third phase discloses that quantity of NOx reduced during the second phase is less than the first NOx reduction target but greater than the second NOx reduction target, the event is logged, with a high degree of confidence, as an indication of the formulation of injected DEF having been non-compliant with the DEF performance standard rather than an indication of a fault in the SCR catalyst. When the third phase discloses that quantity of NOx reduced during the second phase is not less than the first NOx reduction target, the event is logged as an indication of the formulation of injected DEF having been compliant with the DEF performance standard.

Quantity of DEF injected during the second phase may be measured to confirm that the intended quantity of DEF was actually injected. Also, duration of the second phase may be controlled as a function of engine operation, and instantaneous quantity of DEF being injected may be varied during the second phase as a function of engine operation.

Once the second phase has ended, DEF injection may be discontinued to allow the SCR catalyst to be purged of ammonia before DEF injection resumes under control of the DEF injection strategy which was being used before being temporarily interrupted by the intrusive test.

One general aspect of the claimed subject matter relates to a diesel engine exhaust aftertreatment system having a virtual DEF quality monitor as described herein.

Another general aspect of the claimed subject matter relates to the method of performing an intrusive as described herein.

Another general aspect of the claimed subject matter relates to a motor vehicle having a virtual DEF quality monitor as described herein.

The foregoing summary is accompanied by further detail of the disclosure presented in the Detailed Description below with reference to the following drawings which are part of the disclosure.

DETAILED DESCRIPTION

Figure 1:
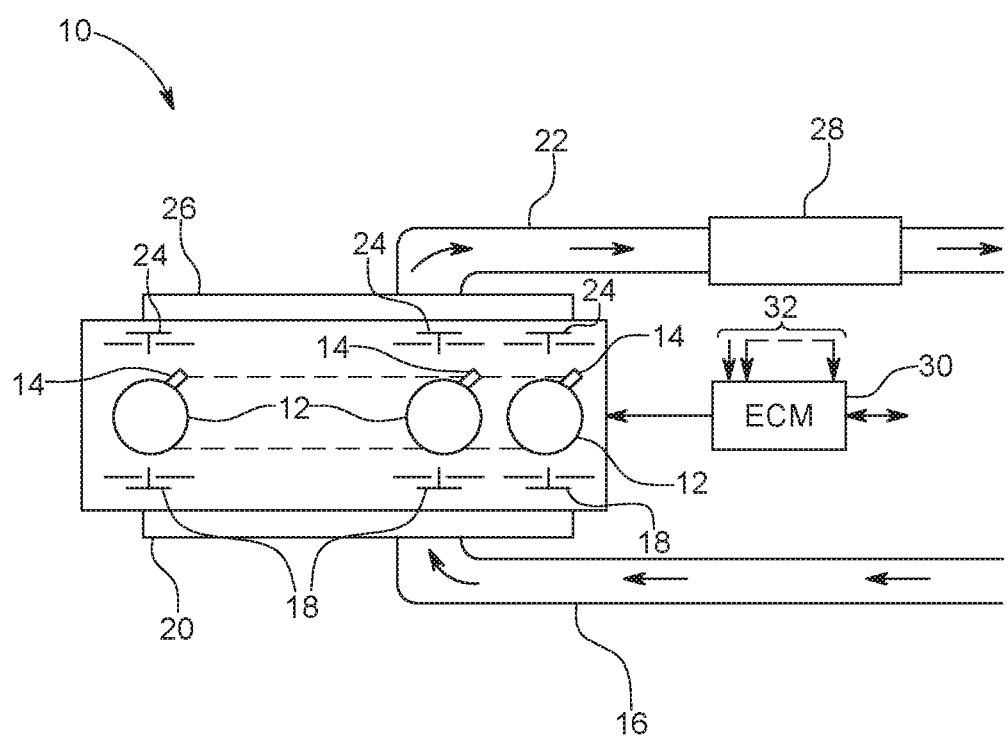
FIG. 1 is a general schematic diagram of an internal combustion engine which utilizes SCR in an exhaust aftertreatment system to reduce NOx in engine exhaust by chemical reaction with ammonia created by injection of DEF into the exhaust.

FIG. 1 shows a representative internal combustion engine 10 which can be used in stationary or mobile applications. A specific example described here is a mobile application in which the engine is a diesel engine 10 which propels a motor vehicle and comprises structure forming a number of engine cylinders 12 into which fuel is injected by fuel injectors 14 to combust with air which has entered combustion chamber spaces of engine cylinders 12 through an intake system 16 when cylinder intake valves 18 for controlling admission of air from an intake manifold 20 into respective engine cylinders 12 are open. Other components which may be present in an intake system of a contemporary diesel engine of a motor vehicle, such as a turbocharger compressor and charge air cooler, are not shown.

Engine 10 also comprises an exhaust system 22 through which engine exhaust created by combustion of fuel injected into the combustion chamber spaces to operate engine 10 is conveyed to atmosphere. Cylinder exhaust valves 24 control admission of exhaust from respective engine cylinders 12 into an exhaust manifold 26 for further conveyance through exhaust system 22.

Exhaust system 22 includes an exhaust aftertreatment system 28 for treating exhaust prior to entry into the atmosphere. Other components which may be present in an exhaust system of a contemporary diesel engine, such as a turbocharger turbine, are not shown.

An engine controller comprises a processor-based engine control module (ECM) 30 which controls various aspects of engine operation, such as fueling of engine cylinders 12 by fuel injectors 14. Control is accomplished by processing various input data, indicated generally by reference numeral 32, to develop control data for control of functions being performed by various devices.

Figures 2, 3:
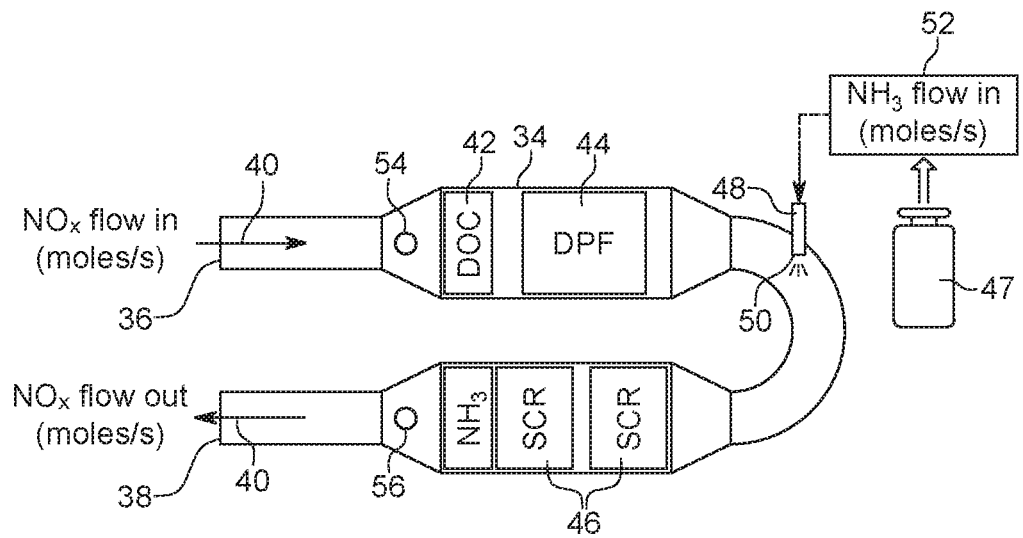
FIG. 2 is a diagram illustrating detail of the exhaust aftertreatment system of the engine of FIG. 1.
FIG. 3 is a diagram showing chemistry of NOx conversion, calculation of urea concentration in injected DEF, and calculation of DEF dilution from the calculation of urea concentration.

Exhaust aftertreatment system 28 is shown in FIG. 2 to comprise structure through which exhaust is constrained to pass before exiting the system. The particular structure shown should be understood to be essentially schematic in nature rather than that of an actual aftertreatment system. The system comprises an enclosure 34 providing an exhaust flow path between an exhaust entrance 36 at an upstream end, and an exhaust exit 38 at a downstream end. Arrows 40 indicate a direction of exhaust flow into, through, and out of the interior of enclosure 34.

Within its interior, enclosure 34 contains a diesel oxidation catalyst (DOC) 42 downstream of exhaust entrance 36, a diesel particulate filter (DPF) 44 downstream of DOC 42, and a two-element SCR catalyst (SCR) 46 downstream of DPF 44. The reference to NH3 in FIG. 2 indicates that ammonia molecules are stored on surface sites of SCR catalyst 46. Exhaust which enters the interior of enclosure 34 through exhaust entrance 36 is forced to pass first across DOC 42, next across DPF 44, and subsequently across SCR catalyst 46 before exiting through exhaust exit 38. DOC 42 treats engine exhaust by removing certain entrained matter, such as the soluble organic fraction of diesel particulate matter. DPF 44 removes entrained soot from the exhaust, and SCR catalyst 46 treats engine exhaust by reducing NOx according to chemical reactions such as the two reactions shown in FIG. 3 and repeated below here with the addition of a third possible reaction which may occur under certain circumstances.

$$4NO+4NH_3+O_2 \rightarrow 4N_2+6H_2O$$

$$NO+NO_2+2NH_3 \rightarrow 2N_2+3H_2O$$

$$6NO_2+8NH_3 \rightarrow 7N_2+12H_2O$$

A tank 47 shown in FIG. 2 stores DEF which is used for NOx reduction. As mentioned earlier, DEF is an aqueous urea solution comprising urea and water, a commercial example being a solution of 32.5% urea and 67.5% deionized water. DEF is introduced from tank 47 by a delivery system into the interior of enclosure 34 through a conduit to a DEF injector 48 having an outlet 50 disposed at a location downstream of DPF 44 and upstream of SCR catalyst 46. As also mentioned earlier, thermal energy in the exhaust flow vaporizes the water component and decomposes the urea component of the injected DEF according to known chemical reactions to create free ammonia molecules which are captured at catalytic sites on surfaces of SCR 46 for reducing NOx in exhaust moving across those surfaces in accordance with the above chemical reactions.

The engine controller includes a DEF injector controller 52 which controls quantity of DEF from tank 47 which is injected by DEF injector 48 into enclosure 34 by a processor's processing of various data, including data from ECM 30 with which it has communication. DEF injector controller 52 may be a separate control module for exclusive use in DEF injection control or may be implemented in ECM 30.

A first NOx sensor 54 measures NOx flow in diesel engine exhaust which has entered entrance 36. A second NOx sensor 56 measures NOx flow in treated diesel engine exhaust exiting exit 38. The processor processes a NOx measurement from first NOx sensor 54 and a NOx measurement from second NOx sensor 56 to calculate actual NOx reduction. The processor converts the measurements from the two NOx sensors into appropriate units of measurement such as moles of NOx per second for example. The processing includes alignment of the measurements provided by the respective NOx sensors 54, 56 to account for transit time for exhaust passing NOx sensor 54 to reach NOx sensor 56.

NOx in diesel engine exhaust which has entered entrance 36 may be measured by an actual NOx sensor and/or by a virtual NOx sensor. A virtual NOx sensor can provide real time NOx measurements by estimation using an engine map derived from modeling engine 10. The map correlates engine-out NOx with various operating parameters, some or all of which are provided by actual sensors associated with operation of engine 10. Examples of estimating engine-out NOx can be found in various patents and patent publications. References herein to a first NOx sensor should therefore be understood to mean either or both an actual NOx sensor and a virtual NOx sensor.

With engine 10 operating, a virtual DEF quality monitor which is embodied in the engine controller repeatedly performs an intrusive test which starts with a first phase during which SCR catalyst 46 is sufficiently purged of stored ammonia to allow a second phase to begin. The second phase begins with DEF injector 48 injecting DEF into engine exhaust for a limited period of time as engine 10 continues to operate. Controller 52 controls total quantity of DEF injected over this limited period of time such that the total does not exceed a predetermined capability of SCR catalyst 46 to perform NOx reduction which would provide NOx emission compliance assuming that SCR catalyst 46 has no degradation in its ability to store ammonia greater than a selected percentage of degradation. Predetermined capability of SCR catalyst 46 to perform such NOx reduction will be explained later by quantitative example.

The second phase causes the DEF injector to inject DEF in quantity which, for DEF whose formulation complies with a DEF performance standard, has been predetermined to enable the SCR catalyst to reduce quantity of NOx in engine exhaust to a quantity not less than a first NOx reduction target which is greater than a second NOx reduction target below which failure of the SCR catalyst is indicated. Upon completion of the second phase, the third phase processes measurements obtained from the first sensor and the second sensor during the second phase to calculate quantity of NOx reduced during the second phase. When the third phase discloses that quantity of NOx reduced during the second phase is less than the first NOx reduction target but greater than the second NOx reduction target, the event is logged, with a high degree of confidence, as an indication of the formulation of injected DEF having been non-compliant with the DEF performance standard rather than an indication of a fault in the SCR catalyst. When the third phase discloses that quantity of NOx reduced during the second phase is not less than the first NOx reduction target, the event is logged as an indication of the formulation of injected DEF having been compliant with the DEF performance standard. Dilution of non-compliant DEF may also be quantitatively expressed.

The following example explains predetermined capability of a degraded SCR catalyst 46 to perform NOx reduction. If a new SCR catalyst has a capability to reduce 20 g of NOx per hour but when 50% degraded can reduce only 10 g of NOx per hour, a NOx reduction target for an intrusive test will be no greater than 10 g of NOx per hour, and therefore quantity of DEF injected during an intrusive test will be controlled to limit the NOx reduction rate to no greater than a target of 10 g of NOx per hour during an intrusive test. Duration of the second phase may be controlled as a function of engine operation, and the instantaneous quantity of DEF being injected may also be varied on the basis of engine operation.

The measurements obtained during the second phase can be processed in the following manner to obtain a measure of dilution of injected DEF. First urea concentration of the injected DEF is calculated in accordance with a urea concentration calculation shown in FIG. 3. Finally, the urea concentration calculation is used in a dilution calculation shown in FIG. 3 to calculate dilution of the injected DEF. A calculated dilution of injected DEF can have a value of 1.00 (meaning no dilution) or less than 1.00 (meaning some dilution).

A small amount of DEF dilution can be tolerated, and indeed as a practical matter, is to be expected. When a calculated dilution value is not less than a dilution value which demarcates tolerable dilution from excessive dilution, the intrusive test result is logged as a PASS, meaning that the formulation of DEF injected from tank 47 during the test was compliant with the DEF performance standard and can continue to be used for NOx reduction.

However, when a calculated dilution value is less than the value which demarcates tolerable dilution from excessive dilution, the intrusive test result is logged as a FAIL, meaning that the formulation of DEF injected during the test was non-compliant with the DEF performance standard. Because of that result, use of the non-compliant DEF should be promptly discontinued. Prompt discontinuance is encouraged by activation of an inducement strategy (to be described later) which will inform the driver of the FAIL and warn of the possible imposition of certain constraints on continued engine operation in order to temporarily mitigate, at least to some extent, non-compliant NOx emissions which may otherwise be occurring. Such constraints however should not compromise the ability of a driver of the vehicle to safely operate the vehicle. A FAIL may also be transmitted via wireless communication to inform others, such as a company which owns the vehicle, that non-compliant DEF has been detected.

Rather than using a single dilution value for distinguishing between a PASS and a FAIL as just described, a limited range of values may instead be substituted. When a calculated dilution is less than an upper limit of the range but greater than a lower limit of the range, the test result may be deemed INCONCLUSIVE rather than a FAIL. The use of a range of values enables a driver of the vehicle, and perhaps other interested parties by wireless communication, to be informed of the probability of an imminent FAIL while allowing the vehicle to continue being operated without activation of the inducement strategy and thereby allow more time for corrective action.

Figure 4:
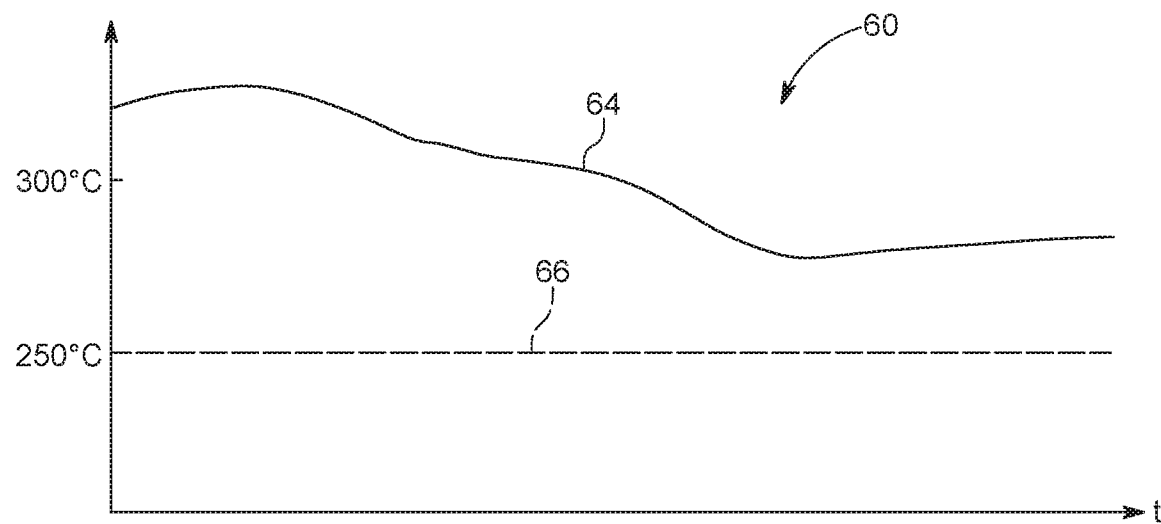
FIGS. 4 and 5 are representative graph plots of certain parameters as a function of time during performance of an intrusive test.
Figure 5:
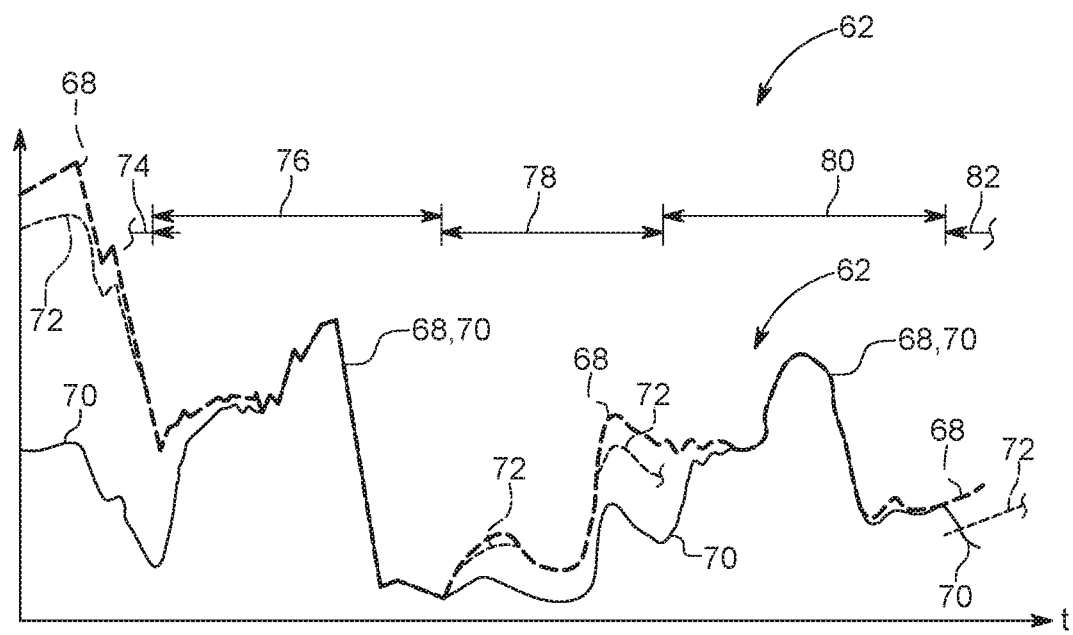

FIGS. 4 and 5 are representative graph plots, 60 and 62 respectively, showing traces of certain parameters as a function of time during performance of an intrusive test. The graph plot axes are not necessarily to scale and the data traces themselves are non-dimensional.

FIG. 4 shows a trace 64 of temperature of SCR catalyst 46 as a function of time. While trace 64 shows varying temperature, all temperatures exceed a minimum temperature, represented by broken line 66 which must be exceeded in order for an intrusive test to be performed. The minimum temperature shown is 250° C. and it should be understood that this particular minimum temperature is merely representative. Temperatures in a range from about 250° C. to about 275° C. are considered suitable minimums for some SCR catalysts presently used in diesel engine exhaust aftertreatment. The optimal temperature range referred to earlier extends from the specified minimum to a maximum of about 400° C. Temperatures within the optimal range, combined with injection of an appropriate quantity of compliant DEF, assure that substantially all ammonia created from injection will be used for NOx reduction without any significant slip. Temperatures within the optimal range also avoid potential creation of undesired constituents like $N_2O$ in exhaust exiting the aftertreatment system.

FIG. 5 shows a solid line trace 68 representing quantity of NOx entering enclosure 34 in units of measurement as explained above, a solid line trace 70 representing quantity of NOx exiting enclosure 34 as explained above, and a discontinuous broken line trace 72 representing quantity of DEF injected by DEF injector 48 as explained above.

FIG. 5 is divided into a succession of five non-dimensional time zones 74, 76, 78, 80, 82 whose time durations are not necessarily on a common scale.

In time zone 74, traces 68, 70, and 72 show that injected DEF is effective to reduce quantity of NOx in exhaust passing across ammonia attachment sites on SCR catalyst 46 because quantity of NOx exiting enclosure 34 (trace 70) is much less than quantity of NOx in exhaust entering enclosure 34 (trace 68). It can be seen that quantity of NOx in exhaust entering enclosure 34 is changing with changes in operation of engine 10 and that DEF injection quantity is being controlled such that changes in trace 70 track changes in trace 68, showing that NOx reduction is occurring. Difference between the two traces can disclose that NOx reduction is occurring without ammonia slip.

The first phase of an intrusive test begins at the beginning of time zone 76 with DEF injector controller 52 terminating injection of DEF. As time advances through time zone 76, ammonia stored on catalytic sites of SCR catalyst 46 is depleted as it converts NOx, eventually leading to trace 70 attaining essentially full coincidence with trace 68, thereby showing that SCR catalyst 46 has been essentially completely purged of stored ammonia. During time zone 76 it can be seen that quantity of NOx in exhaust entering enclosure 34 is also changing with changes in operation of engine 10.

The second phase of the intrusive test begins at the beginning of time zone 78 with DEF injector controller 52 once again beginning to inject DEF as engine 10 continues to operate. As time advances through time zone 78, DEF injector controller 52 controls injected DEF to follow changes in engine operation while limiting the total quantity injected during time zone 78 so as not to exceed a predetermined capability of SCR catalyst 46 to perform NOx reduction which would provide NOx emission compliance assuming that SCR catalyst 46 has no degradation in its ability to store ammonia greater than a selected percentage degradation as mentioned earlier. It can be seen that traces 68, 70 are no longer coincident, showing that NOx is being reduced. As mentioned earlier, DEF injector controller 52 may also be measuring quantity of DEF being injected to confirm that the intended quantity is indeed being injected.

The second phase ends at the beginning of time zone 80, and it is during time zone 80 that ammonia stored on SCR catalyst 46 is completely purged. As in prior time zones, trace 68 shows that quantity of NOx in exhaust entering enclosure 34 varies with how engine 10 is operating. As time enters time zone 82, controller 52 returns to injecting DEF as it did before the beginning of time zone 76.

Figure 6:
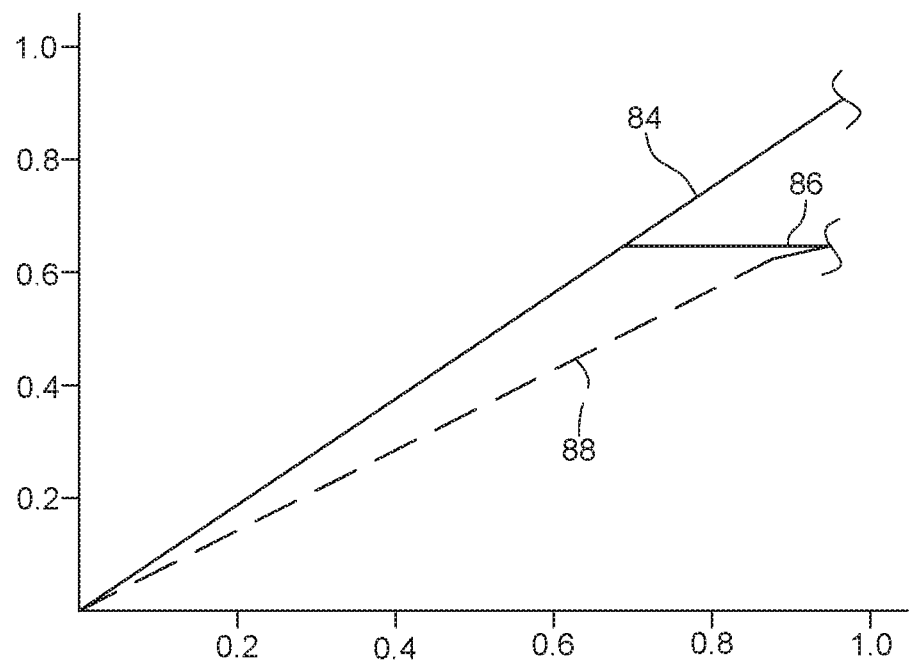
FIG. 6 is a representative graph plot useful in understanding details of an intrusive test.

FIG. 6 graphically portrays in a simplified way how DEF dilution is measured. The vertical axis represents actual NOx conversion, and the horizontal axis represents expected NOx conversion. A straight line 84 represents the capability of a new SCR catalyst to achieve actual NOx conversion equal to NOx conversion which would be expected of a new catalyst when manufacturer-compliant DEF is injected.

As the SCR catalyst ages, the range over which it retains that capability decreases. A line 86 which diverges from a point on line 84 shows diminished capability where actual NOx conversion begins to fail to meet expected NOx conversion. As a catalyst ages, the point at which line 86 diverges from line 84 moves down line 84.

A broken line 88 shows diminished NOx conversion when diluted DEF is injected. The difference between lines 84 and 86 at any point along line 84 can be used to calculate a value for DEF dilution as shown in FIG. 3 using urea concentration calculated by the calculation also shown in FIG. 3 which assumes that DEF whose formulation is compliant with its performance standard is being injected. Urea concentration is calculated by integration, over the duration of DEF injection, of difference between entering flow of NOx, as measured in moles per second, and exiting flow of NOx, also as measured in moles per second, the difference being divided by the calculated flow rate of ammonia, measured in moles per second, which would result from the conversion of urea in injected DEF whose formulation is compliant with its performance standard.

Certain conditions precedent must exist before an intrusive test is allowed to start, and some conditions are mandatory for a test to be allowed to start. One mandatory condition precedent is that the result of the immediately preceding intrusive test not have been a FAIL. Another mandatory condition precedent is that SCR temperature be within the previously-mentioned optimal temperature range. If the vehicle has been driven in a way which has resulted in the engine temperature being below the optimal temperature range when the next scheduled iteration of the intrusive test is to begin, the test may be delayed for a limited length of time to allow vehicle operation to return engine temperature to the optimal range, but if that doesn't happen, the engine may be temporarily fueled with extra fuel in order to bring its temperature into the optimal range. It is preferable to wait until engine temperature is at or near the high end of the range in order to minimize the duration of the first phase, but if that temperature isn't reached, a lower one can be tolerated at the expense of a longer duration of the first phase.

Other conditions precedent may include confirmation that NOx sensors, a DEF injector and pump, and an exhaust mass flow sensor are operating properly, and that various temperatures are within proper ranges. An estimate of DEF injection accuracy may also be made. Failure to satisfy any one of whatever mandatory conditions precedent are applicable to a particular intrusive test will disallow the test from being performed until all mandatory conditions have been satisfied.

Some failures may be indicated by fault codes which are logged in the OBD (on-board diagnostic) system of a vehicle. Examples are NOx sensor fault codes, an exhaust mass flow sensor fault code, an ambient temperature sensor fault code, an SCR temperature out fault code, a DOC out temperature fault code, and if the aftertreatment system includes a diesel particulate filter (DPF), a DPF temperature out fault code. The mandatory conditions precedent which are to be used should be selected to provide the best degree of accuracy for an intrusive test.

DEF has a natural tendency to degrade with time and will degrade more quickly when stored at elevated temperature. The virtual DEF quality monitor is capable of detecting degraded DEF in the absence of dilution, but proper maintenance of the aftertreatment system should make it unlikely that degraded DEF would be used for NOx conversion.

DEF can freeze and will in fact freeze if ambient temperature falls below the DEF freezing point for an extended time. Using an ambient temperature sensor to indicate likely freezing of DEF in tank 47 can provide a frozen tank signal which will prevent an intrusive test until the DEF thaws.

An SCR catalyst may become contaminated by substances such as engine coolant or engine lubricating oil which unintentionally enter the exhaust system. Such contamination would likely also affect other aftertreatment devices like a DPF and a DOC and therefore would be expected to be detected by DPF and DOC fault codes which if selected as mandatory conditions precedent would prevent an intrusive test.

Collection of excessive DEF on SCR surfaces may be caused by excessive DEF injection or poor mixing of DEF with exhaust and consequently affect NOx conversion. Excess DEF on SCR surfaces may be indicated by a fault code, but can be removed by SCR regeneration processes before an intrusive test is allowed.

An intrusive test is repeatedly performed according to an established schedule. Occurrence of certain vehicle events may also initiate an intrusive test that is not on an established schedule.

Figure 7:
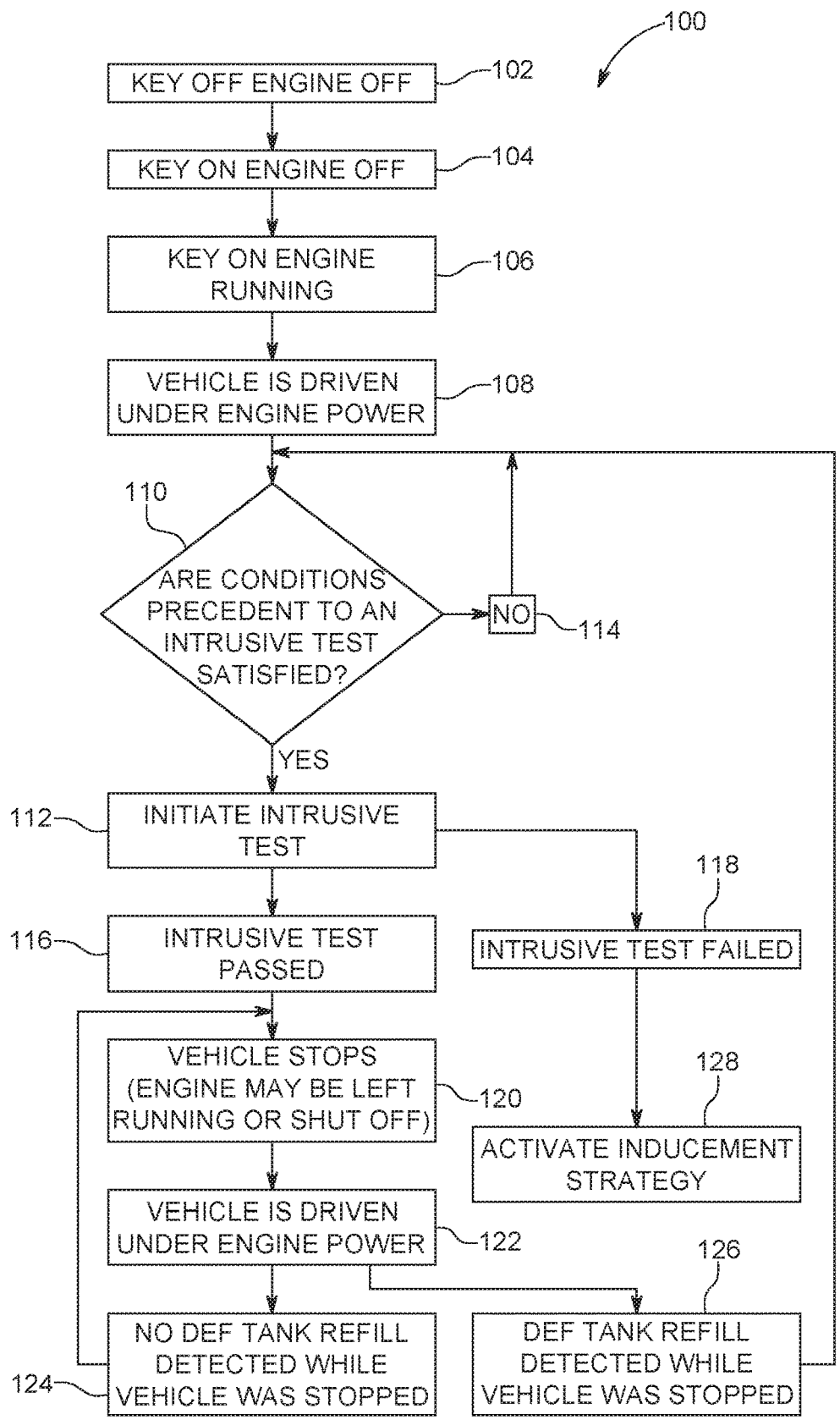
FIG. 7 is a flow diagram showing representative steps of operation of a vehicle before, during, and after an intrusive test.

FIG. 7 shows a diagram 100 of steps of an intrusive test which are performed by the DEF monitor. The starting point 102 shows engine 10 in OFF position. The engine's electrical system, including the DEF monitor, is turned on by the vehicle's ignition switch being switched from OFF to ON (step 104). Engine 10 is started by operating the ignition switch to crank the engine until the engine begins to run (step 106). After the engine has warmed, the vehicle is driven under engine power (step 108). Conditions precedent to an intrusive test are monitored (step 110). Only when all mandatory conditions precedent have been satisfied, is an intrusive test initiated (step 112). Failure of any mandatory condition precedent to be satisfied, disallows an intrusive test from being initiated (step 114), or may temporarily delay a test to allow any unsatisfied mandatory condition precedent to be corrected and become satisfied.

When the intrusive test has been completed, a determination is made as to whether the test was a PASS (step 116) or a FAIL (step 118). If the test result is a PASS, the vehicle can continue to be driven until it eventually stops (step 120) at which time engine 10 may be left running or shut off. A vehicle stop may be an occasion to refill DEF storage tank 47 either with engine 10 running or shut off. After some amount of time has elapsed after the vehicle resumed travel, it is therefore appropriate to perform an intrusive test so that the possibility of the DEF tank having been refilled with a non-compliant liquid will be either disclosed or ruled out. A stop which raises the possibility of DEF tank refill may be indicated in different ways, such as by engine 10 being shut off or idling for an extended length of time without the vehicle travelling. Detection of removal of a cap on the DEF storage tank or of change in amount of liquid in the tank such as by weight or liquid level may also call for an intrusive test. Such events are detected by the engine controller which communicates them to the virtual DEF quality monitor, and as a consequence, the monitor will perform an unscheduled intrusive test if one is not imminent on the test schedule.

Whenever a test result is a FAIL and the inducement strategy which was mentioned earlier is activated, the FAIL is brought to immediate driver attention in one or more prominent ways with the intent of forcing the situation to be promptly corrected. One example of an inducement strategy is to significantly de-rate the engine in any of several known ways.

The intrusive test is referred to as "intrusive" because it temporarily intrudes on the control strategy which is being used for NOx emission compliance. The overall effect of limiting DEF injection during each iteration of the intrusive test in order to eliminate the SCR catalyst as a cause of a FAIL is an increase in the aggregate of NOx exiting the aftertreatment system if no adjustment were made to the existing NOx control strategy. Consequently, the existing NOx control strategy may need some adjustment in order to assure compliance with applicable NOx emission criteria when the virtual DEF quality monitor is used.

The nature of specific intrusive tests for a particular vehicle may depend on how and where the vehicle is to be used. Testing may occur less frequently for line haul applications where a vehicle is traveling for extended periods of time without significant stopping or engine idling, and because of the longer times between tests, minimal additional NOx created by the tests exits the aftertreatment system. Minimizing both test frequency and duration of a test is desirable as long as performance and accuracy are not compromised. Representative test times range from about 3 minutes to about 6 minutes. The first phase (time zone 76) takes most of the time. The second phase (time zone 78) takes about one minute, and is followed by about a 20 second ammonia purge (time zone 80).

Figure 8:
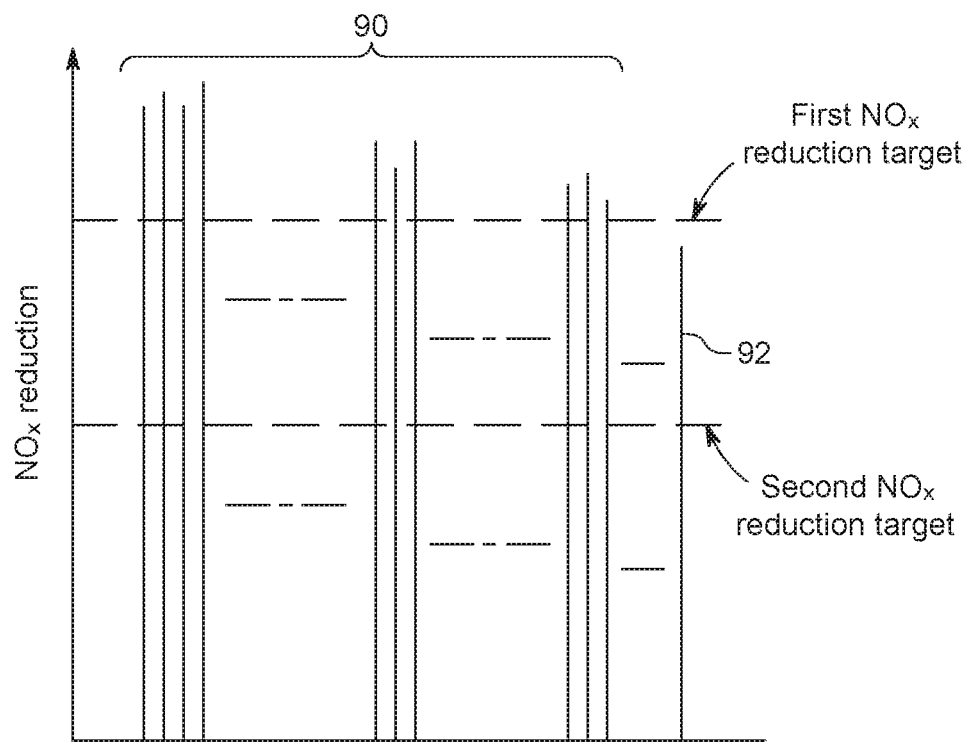
FIGS. 8 and 9 are charts useful in explaining certain foundational principles of the intrusion test.
Figure 9:
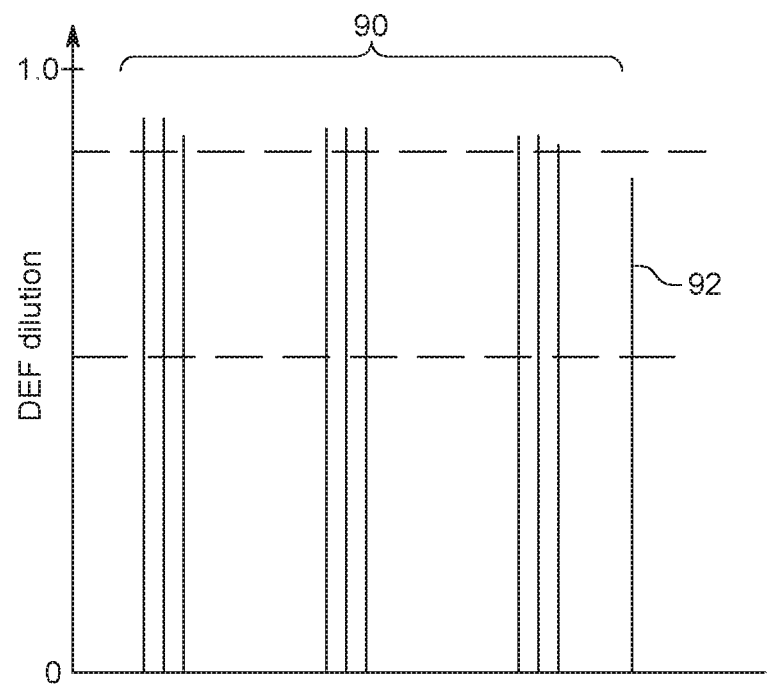

Failure of an exhaust aftertreatment system to comply with applicable NOx emission criteria can be caused in a variety of ways. Use of excessively diluted or degraded DEF is one way. Excessive degradation of an SCR catalyst is another way. If a succession of prior intrusive tests have not disclosed a FAIL, an intrusive test whose result is a FAIL has a high probability of being attributable to use of adulterated DEF and not the fault of the SCR catalyst. FIGS. 8 and 9 graphically portray why that is so.

The vertical axis of FIG. 8 represents NOx reduction, and the vertical axis of FIG. 9 represents DEF dilution. The first NOx reduction target and the second NOx reduction target are marked in FIG. 8 which also shows a succession of vertical lines representing intrusive test results. As long as the SCR catalyst has not degraded more than a selected percentage of degradation and formulation-compliant DEF has been used, test results which are collectively indicated by reference numeral 90 will be not less than the first NOx reduction target and therefore be logged as PASSES although at some point start they will eventually move closer and closer to the first NOx reduction target. The first test result, such as result 92, which is less than the first NOx reduction target but greater than the second NOx reduction target, is logged as a FAIL which discloses, with a high degree of accuracy that the cause is due to use of non-formulation-compliant DEF rather than failure of the SCR catalyst.

FIG. 9 portrays the same test results 90, 92 in terms of DEF dilution.

It is possible that a FAIL result may be less than the second NOx reduction target which would suggest a sudden unexpected failure of the SCR catalyst. However such a result would more likely be detected by other diagnostics such as those mentioned earlier and such detection would prevent an intrusive test which would produce a result less than the second NOx reduction target.

What is claimed is:

1. A diesel engine exhaust aftertreatment system comprising:
an entrance through which untreated diesel engine exhaust enters and an exit through which treated diesel engine exhaust exits, a first sensor which, when the engine is operating, measures quantity of NOx in diesel engine exhaust entering the aftertreatment system and a second sensor which, when the engine is operating, measures quantity of NOx in diesel engine exhaust exiting the aftertreatment system, an SCR catalyst for converting NOx in diesel engine exhaust passing through the aftertreatment system into nitrogen ($N_2$) and water ($H_2O$) by selective catalytic reduction, a diesel exhaust fluid (DEF) injector for injecting DEF into diesel engine exhaust upstream of the SCR catalyst, and an engine control system comprising a controller for controlling quantity of DEF injected by the DEF injector and a virtual DEF quality monitor operable to monitor DEF quality;
the virtual DEF quality monitor being operable with the engine operating 1) to repeatedly perform an intrusive test which comprises successive first, second, and third phases, the first phase comprising preventing the DEF injector from injecting DEF until measurements from the first sensor and the second sensor disclose that the SCR catalyst has been sufficiently purged of stored ammonia for allowing the second phase to proceed, the second phase comprising causing the DEF injector to inject DEF in quantity which, for DEF whose formulation is compliant with a DEF performance standard, has been predetermined to enable the SCR catalyst to reduce quantity of NOx in engine exhaust to a quantity not less than a first NOx reduction target which is greater than a second NOx reduction target below which failure of the SCR catalyst is indicated, and the third phase comprising processing measurements obtained from the first sensor and the second sensor during the second phase to calculate quantity of NOx reduced during the second phase, 2) when the third phase discloses that quantity of NOx reduced during the second phase is less than the first NOx reduction target but greater than the second NOx reduction target, to log the event as an indication of the formulation of injected DEF having been non-compliant with the DEF performance standard, and 3) when the third phase discloses that quantity of NOx reduced during the second phase is not less than the first NOx reduction target, to log the event as an indication of the formulation of injected DEF having been compliant with the DEF performance standard.

2. The diesel engine exhaust aftertreatment system as set forth in claim 1 in which the monitor is further operable to calculate % dilution of DEF injected during the second phase using quantity of DEF injected and NOx measurements obtained from the first sensor and the second sensor during the second phase.

3. The diesel engine exhaust aftertreatment system as set forth in claim 1 in which the monitor is further operable to cause the intrusive test to purge the SCR catalyst of ammonia after completion of the second phase.

4. The diesel engine exhaust aftertreatment system as set forth in claim 1 in which the monitor is operable to repeatedly perform a succession of intrusive tests.

5. The diesel engine exhaust aftertreatment system as set forth in claim 4 in which the monitor is operable to condition performance of an intrusive test on at least one condition precedent.

6. The diesel engine exhaust aftertreatment system as set forth in claim 4 in which the monitor is operable to condition performance of an intrusive test on the immediately preceding intrusive test having disclosed quantity of NOx reduced during the second phase being no less than the first NOx reduction target.

7. A method for distinguishing use of diesel exhaust fluid (DEF) whose formulation is compliant with a DEF performance standard from use of DEF whose formulation is non-compliant with the DEF performance standard in a diesel engine exhaust aftertreatment system having an entrance through which untreated diesel engine exhaust enters and an exit through which treated diesel engine exhaust exits, an SCR catalyst for converting NOx in diesel engine exhaust passing through the aftertreatment system into nitrogen ($N_2$) and water ($H_2O$), a DEF injector for injecting DEF into diesel engine exhaust upstream of the SCR catalyst, a first sensor for measuring quantity of NOx in diesel engine exhaust entering the aftertreatment system, a second sensor for measuring quantity of NOx in diesel engine exhaust exiting the aftertreatment system, and an engine control system comprising a controller for controlling quantity of DEF injected by the DEF injector and a virtual DEF quality monitor operable to perform a method for disclosing DEF quality;

the method comprising:
with the engine operating, 1) repeatedly performing an intrusive test having successive first, second, and third phases, the first phase comprising preventing the DEF injector from injecting DEF until measurements from the first sensor and the second sensor disclose that the SCR catalyst has been sufficiently purged of stored ammonia for allowing the second phase to proceed, the second phase comprising causing the DEF injector to inject DEF in quantity which, for DEF which is compliant with a DEF performance standard, has been predetermined to enable the SCR catalyst to reduce quantity of NOx in engine exhaust to a quantity not less than a first NOx reduction limit which is greater than a second NOx reduction limit which, if exceeded, would disclose failure of the SCR catalyst, the third phase comprising processing measurements obtained from the first sensor and the second sensor during the second phase to calculate quantity of NOx reduced during the second phase, 2) when the third phase discloses that quantity of NOx reduced during the second phase is less than the first NOx reduction limit but greater than the second NOx reduction limit, logging the event as an indication of the formulation of injected DEF having been non-compliant with the DEF performance standard, and 3) when the third phase discloses that quantity of NOx reduced during the second phase is not less than the first NOx reduction target, logging the event as an indication of the formulation of injected DEF having been compliant with the DEF performance standard.

8. The method as set forth in claim 7 further comprising calculating % dilution of DEF injected during the second phase using quantity of DEF injected and NOx measurements obtained from the first sensor and the second sensor during the second phase.

9. The method as set forth in claim 7 further comprising causing the intrusive test to purge the SCR catalyst of ammonia after completion of the second phase.

10. The method as set forth in claim 7 comprising repeatedly performing a succession of intrusive tests.

11. The method as set forth in claim 10 comprising conditioning performance of an intrusive test on at least one condition precedent.

12. The method as set forth in claim 10 comprising conditioning performance of an intrusive test on the immediately preceding intrusive test having disclosed that quantity of NOx reduced during the second phase is greater than the first NOx reduction target.

13. A motor vehicle comprising:
a diesel engine for propelling the vehicle, the diesel engine having an engine exhaust aftertreatment system having an entrance through which untreated diesel engine exhaust enters and an exit through which treated diesel engine exhaust exits, the system comprising a first sensor which, when the engine is operating, measures quantity of NOx in diesel engine exhaust entering the aftertreatment system and a second sensor which, when the engine is operating, measures quantity of NOx in diesel engine exhaust exiting the aftertreatment system, an SCR catalyst for converting NOx in diesel engine exhaust passing through the aftertreatment system into nitrogen ($N_2$) and water ($H_2O$), a diesel exhaust fluid (DEF) storage tank for storing DEF, an injector for injecting DEF from the storage tank into diesel engine exhaust upstream of the SCR catalyst, and an engine control system comprising a controller for controlling quantity of DEF injected by the DEF injector; and a virtual DEF quality monitor which is operable with the engine operating 1) to repeatedly perform an intrusive test which comprises successive first, second, and third phases, the first phase comprising preventing the DEF injector from injecting DEF until measurements from the first sensor and the second sensor disclose that the SCR catalyst has been sufficiently purged of stored ammonia for allowing the second phase to proceed, the second phase comprising causing the DEF injector to inject DEF in quantity which, for DEF whose formulation is compliant with a DEF performance standard, has been predetermined to enable the SCR catalyst to reduce quantity of NOx in engine exhaust to a quantity not less than a first NOx reduction target which is greater than a second NOx reduction target below which failure of the SCR catalyst is indicated, and the third phase comprising processing measurements obtained from the first sensor and the second sensor during the second phase to calculate quantity of NOx reduced during the second phase, 2) when the third phase discloses that quantity of NOx reduced during the second phase is less than the first NOx reduction target but greater than the second NOx reduction target, to log the event as an indication of the formulation of injected DEF having been non-compliant with the DEF performance standard, and 3) when the third phase discloses that quantity of NOx reduced during the second phase is not less than the first NOx reduction target, to log the event as an indication of the formulation of injected DEF having been compliant with the DEF performance standard.

14. The motor vehicle as set forth in claim 13 in which the monitor is further operable to calculate % dilution of DEF injected during the second phase using quantity of DEF injected and NOx measurements obtained from the first sensor and the second sensor during the second phase.

15. The motor vehicle as set forth in claim 13 in which the monitor is further operable to cause the intrusive test to purge the SCR catalyst of ammonia after completion of the second phase.

16. The motor vehicle as set forth in claim 13 in which the monitor is operable to repeatedly perform a succession of intrusive tests.

17. The motor vehicle as set forth in claim 16 in which the monitor is operable to condition performance of an intrusive test on at least one condition precedent.

18. The motor vehicle as set forth in claim 16 in which the monitor is operable to condition performance of an intrusive test on the immediately preceding intrusive test having disclosed that quantity of NOx reduced during the second phase is greater than the first NOx reduction target.

19. The motor vehicle as set forth in claim 13 in which the controller is operable to detect a vehicle event which provides a potential opportunity for DEF in the DEF storage tank to be diluted and to cause the monitor to perform an intrusive test in consequence of detection of such a vehicle event.

20. The motor vehicle as set forth in claim 19 in which the controller is operable to detect the vehicle having been stopped for more than a predetermined length of time before resuming travel and to cause the monitor to perform an intrusive test after the vehicle has resumed travel after having been stopped for more than the predetermined length of time.

* * * * *